(12) United States Patent
Mukai

(10) Patent No.: US 8,743,289 B2
(45) Date of Patent: Jun. 3, 2014

(54) IMAGE DISPLAY APPARATUS AND IMAGE DISPLAY METHOD

(75) Inventor: Kazuo Mukai, Kyoto (JP)

(73) Assignee: Panasonic Corporation, Osaka (JP)

( * ) Notice: Subject to any disclaimer, the term of this patent is extended or adjusted under 35 U.S.C. 154(b) by 195 days.

(21) Appl. No.: 12/910,339

(22) Filed: Oct. 22, 2010

(65) Prior Publication Data

US 2011/0096238 A1  Apr. 28, 2011

(30) Foreign Application Priority Data

Oct. 26, 2009  (JP) ................ 2009-245139

(51) Int. Cl.
  *H04N 5/202* (2006.01)
  *H04N 9/69* (2006.01)
(52) U.S. Cl.
  USPC ................ 348/674; 348/675; 345/594
(58) Field of Classification Search
  USPC ............. 348/674, 675, 254, 256; 345/594; 358/519
  See application file for complete search history.

(56) References Cited

U.S. PATENT DOCUMENTS

| | | | | |
|---|---|---|---|---|
| 7,551,179 B2 * | 6/2009 | Sakakibara et al. | ........ | 345/594 |
| 2006/0164442 A1 * | 7/2006 | Furuhata et al. | ........ | 345/690 |
| 2007/0046596 A1 | 3/2007 | Sakakibara et al. | | |

FOREIGN PATENT DOCUMENTS

| | | |
|---|---|---|
| EP | 1752958 A2 * | 2/2007 |
| JP | 05-080101 | 4/1993 |
| JP | 10-049068 | 2/1998 |
| JP | 2007-047440 | 2/2007 |
| JP | 2007-226052 | 9/2007 |
| JP | 2009-171192 | 7/2009 |

* cited by examiner

*Primary Examiner* — Michael Lee
(74) *Attorney, Agent, or Firm* — Hamre, Schumann, Mueller & Larson, P.C.

(57) ABSTRACT

An image display apparatus of the present invention includes: a picture display unit that forms and displays an optical image based on a video signal; a gamma adjustment image display unit that displays a gamma adjustment image containing input/output characteristics of a signal level of the video signal in the displayed optical image; an adjustment operation unit that changes the displayed input/output characteristics on the image; and an input/output characteristics setting unit that sets input/output characteristics of the signal level of the video signal in accordance with the input/output characteristics changed on the image. The adjustment operation unit includes a point selecting part that selects an adjustment point desired to be changed in the input/output characteristics displayed in the image and a level changing part that is capable of changing both of an input level and an output level of the selected adjustment point. Because both of an input signal level and an optical output level can be adjusted, a user can make gamma adjustment easily, freely, and in detail.

7 Claims, 8 Drawing Sheets

IMAGE DISPLAY APPARATUS AND IMAGE DISPLAY METHOD

BACKGROUND OF THE INVENTION

1. Field of the Invention

The present invention relates to an image display apparatus and an image display method in which a user is capable of performing gamma adjustment easily and in detail with respect to images such as picture contents.

2. Description of Related Art

In recent years, there is an increasing demand for image display apparatuses capable of displaying a vibrant picture on a large screen, along with the spread of digital versatile disks (DVDs), blu-ray disks (BDs), and the like. Examples of such image display apparatuses include projectors that are projection type image display apparatuses, which can be combined with a screen to display a large screen picture.

Of the projectors, a projector, particularly, for home use that is commercially available is being requested to have higher image quality and more functions every year, along with an increase in size of a screen. Therefore, the projector tends to have various functions of adjusting images so that a user can adjust images such as picture contents in accordance with the user's preference. The functions of adjusting images include gamma adjustment, i.e., a function of adjusting the level of an optical output with respect to the level of a video signal input to an image display apparatus. A device has also been proposed, which has a function for allowing a user to adjust a level of an optical output with respect to the level of an input signal of a particular picture while watching a screen of an on-screen menu, for performing gamma adjustment.

An example of the function of adjusting images mounted on a projector is described in US 2007/0046596 A1, and JP 2009-171192 A. The function of gamma adjustment described in this document is one allowing a user to adjust an optical output level with respect to each input level at positions of a plurality of particular input signal levels prepared previously on a producer side.

However, in the function of gamma adjustment mounted on a projector described in the above-mentioned document, the user can adjust an optical output level only at positions of input signal levels prepared previously on a producer side. Therefore, there is a limit for a user to adjust an optical output level with the input signal level preferred by the user, which makes it difficult for the user to perform adjustment freely and in detail. Further, this function is limited to the adjustment of Y (luminance), and therefore, it is impossible to perform adjustment with each color of R, G, and B.

SUMMARY OF THE INVENTION

Therefore, with the foregoing in mind, the present invention solves the above-mentioned conventional problems, and its object is to provide an image display apparatus and an image display method enabling a user to perform gamma adjustment easily, freely, and in detail.

An image display apparatus of the present invention includes: a picture display unit that forms and displays an optical image based on a video signal; a gamma adjustment image display unit that displays a gamma adjustment image containing input/output characteristics of a signal level of the video signal in the displayed optical image; an adjustment operation unit that changes the displayed input/output characteristics on the image; and an input/output characteristics setting unit that sets input/output characteristics of the signal level of the video signal in accordance with the input/output characteristics changed on the image. The adjustment operation unit includes a point selecting part that selects an adjustment point desired to be changed in the input/output characteristics displayed in the image and a level changing part that is capable of changing both of an input level and an output level of the selected adjustment point.

An image display method of the present invention includes: forming and displaying an optical image based on a video signal; displaying a gamma adjustment image containing input/output characteristics of a signal level of the video signal in the displayed optical image; changing the displayed input/output characteristics on the image; and setting the input/output characteristics of the signal level of the video signal in accordance with the input/output characteristics changed on the image, wherein, when the input/output characteristics are changed on the image, an adjustment point desired to be changed in the input/output characteristics displayed in the image is selected, and both of an input level and an output level of the selected adjustment point are changed.

According to the above-mentioned configuration, when a user performs gamma adjustment, the user can change both the input level and the output level of a video signal, and hence, can perform adjustment easily, freely, and in detail.

DETAILED DESCRIPTION OF THE INVENTION

The image display apparatus of the present invention can assume the following aspects based on the above-mentioned configuration.

More specifically, the image display apparatus of the present invention can be configured so as to include an adjustment value storage memory capable of storing and reading data of the changed input/output level.

Further, the image display apparatus of the present invention can be configured in such a manner that data of the stored input/output level can be read and rewritten via an input/output terminal enabling control from outside. According to this configuration, regarding the set value of the adjusted result, the set value data of gamma adjustment can be exchanged easily among users, for example, storage data can be copied to a main body of another device, using an external control tool.

Further, the adjustment operation unit can be configured so as to perform an operation of changing an input level and an output level with respect to Y (luminance).

Further, the adjustment operation unit can be configured so as to perform an operation of changing an input level and an output level with respect to any monochrome of R, G, and B.

Further, the image display apparatus of the present invention can be provided with a freeze processing circuit enabling the adjustment of the input/output characteristics while freezing a moving image signal.

Hereinafter, the present invention will be described in detail by way of illustrative embodiments with reference to the drawings.

Embodiment 1

Figure 1:
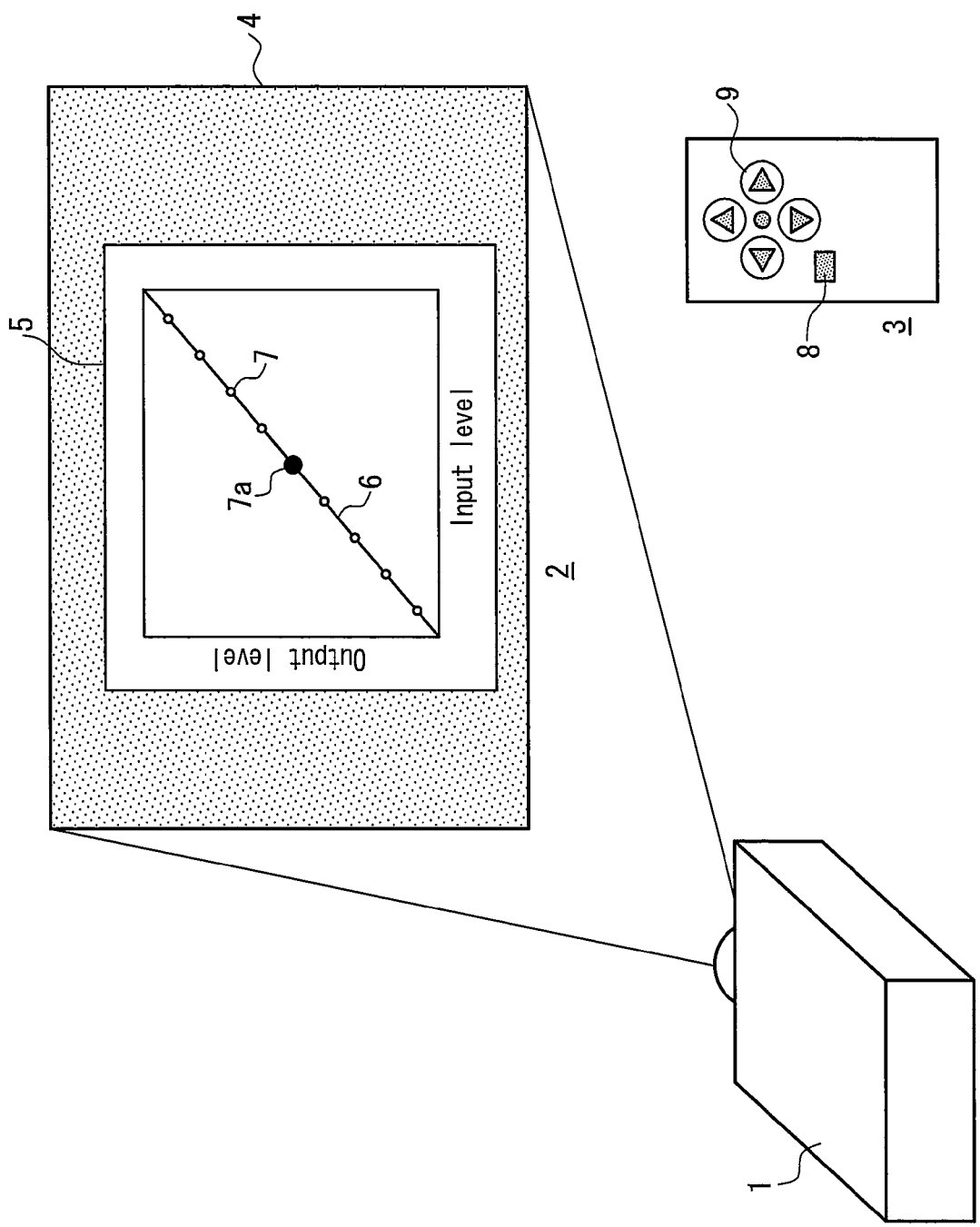
FIG. 1 is a perspective view illustrating an example of a display screen on which an image for performing gamma adjustment is displayed by an image display apparatus of Embodiment 1 according to the present invention.

FIG. 1 is a perspective view illustrating an example of a display screen 2 on which an image for performing gamma adjustment is displayed by an image display apparatus 1 of Embodiment 1 according to the present invention. FIG. 1 further illustrates a remote controller 3, which is an example of an operation unit for operating gamma adjustment.

An ordinary picture display image 4 based on a video signal is displayed on the display screen 2, and a gamma adjustment image 5 displaying a diagram showing input/output characteristics is displayed in the picture display image 4. In the input/output characteristics diagram displayed in the gamma adjustment image 5, a horizontal axis represents an input level and a vertical axis represents an output level. On a reference line 6 showing initial input/output characteristics, adjustment points 7 corresponding to respective values of input levels are displayed. Of the adjustment points 7, an adjustment point 7a desired to be changed is displayed in a form so as to be discriminated from other adjustment points 7.

The remote controller 3 is provided with a selection button 8 composing a part of the operation buttons as means for selecting a point desired to be changed. The remote controller 3 also is provided with change buttons 9 composed of buttons operating the movement in vertical and horizontal directions as means for changing an input level and an output level of the selected point, which constitute an adjustment operation unit.

Figure 2:
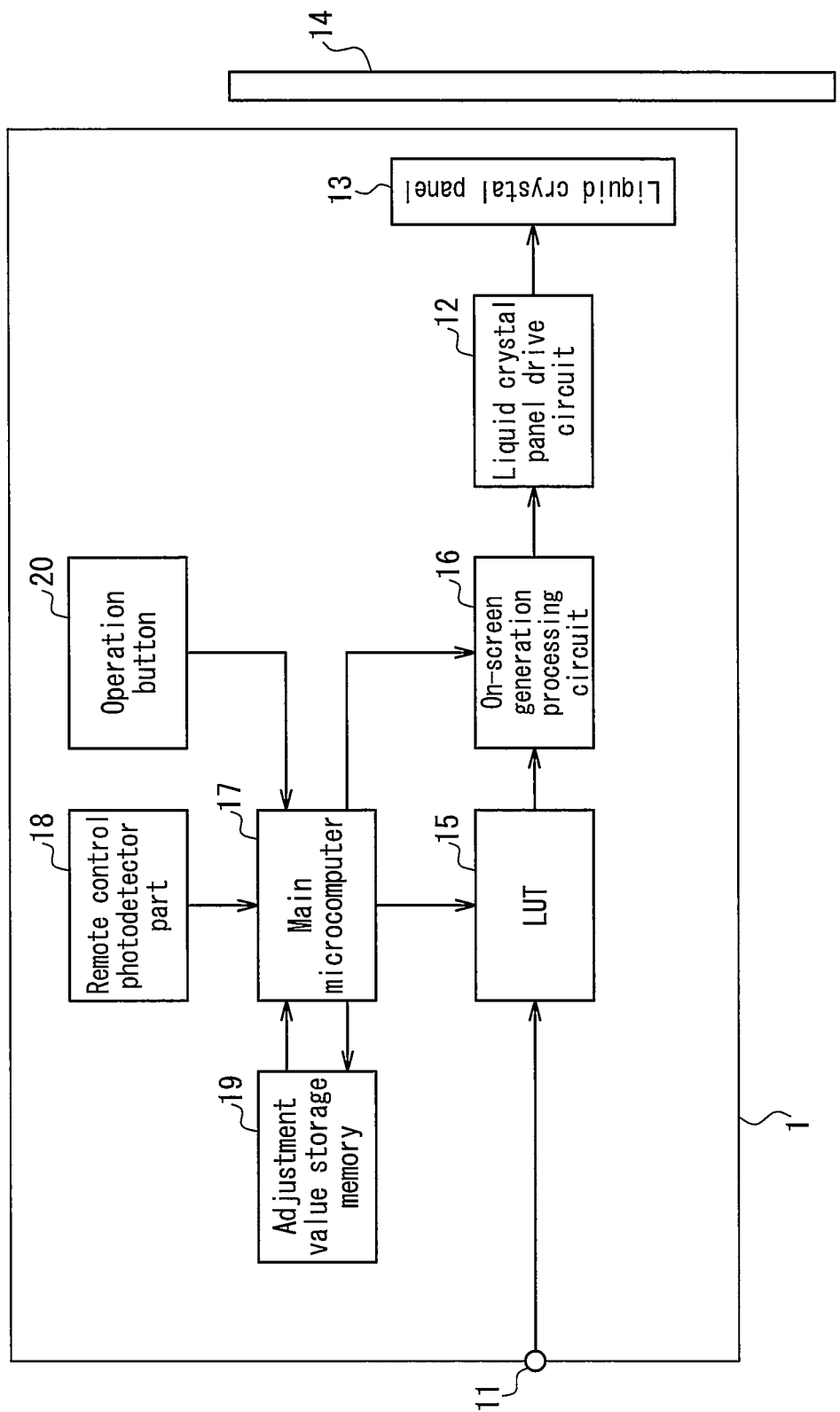
FIG. 2 is a block diagram illustrating a circuit configuration of the image display apparatus of Embodiment 1 according to the present invention.

FIG. 2 is a block diagram illustrating a circuit configuration of the image display apparatus 1. Elements related to a gamma adjustment image display unit for displaying the gamma adjustment image 5 of FIG. 1 mainly are illustrated, and elements related to a picture display unit for displaying the picture display image 4 are illustrated in a simplified manner.

The image display apparatus 1 is configured so as to process a video signal input from a video signal input terminal 11, form an optical image on a liquid crystal panel 13 by a liquid crystal panel drive circuit 12, and project the optical image onto a screen 14. Thus, the picture display unit for displaying the picture display image 4 of FIG. 1 as a picture based on a video signal is configured. It should be noted that a signal processing circuit for this purpose is not shown since a well-known configuration may be adopted.

The input video signal is supplied to an on-screen generation processing circuit 16 via a look-up table (LUT) 15. The on-screen generation processing circuit 16 outputs, based on the output signal from the LUT 15, a signal for displaying an on-screen menu to the liquid crystal panel drive circuit 12. Thus, the gamma adjustment image display unit is configured. The operations of the LUT 15 and the on-screen generation processing circuit 16 are controlled by a main controller (microcomputer) 17.

To the main microcomputer 17, a remote control photodetector part 18 that receives light representing a remote control code generated by a remote control operation, an adjustment value storage memory 19 for storing an adjustment value of gamma adjustment, and operation buttons 20 mounted on a main body are connected. Gamma data is created based on the adjustment value stored in the adjustment value storage memory 19 and supplied to the LUT 15. The LUT 15 constitutes an input/output characteristics setting unit for setting input/output characteristics of a video signal in accordance with gamma data.

Figure 3:
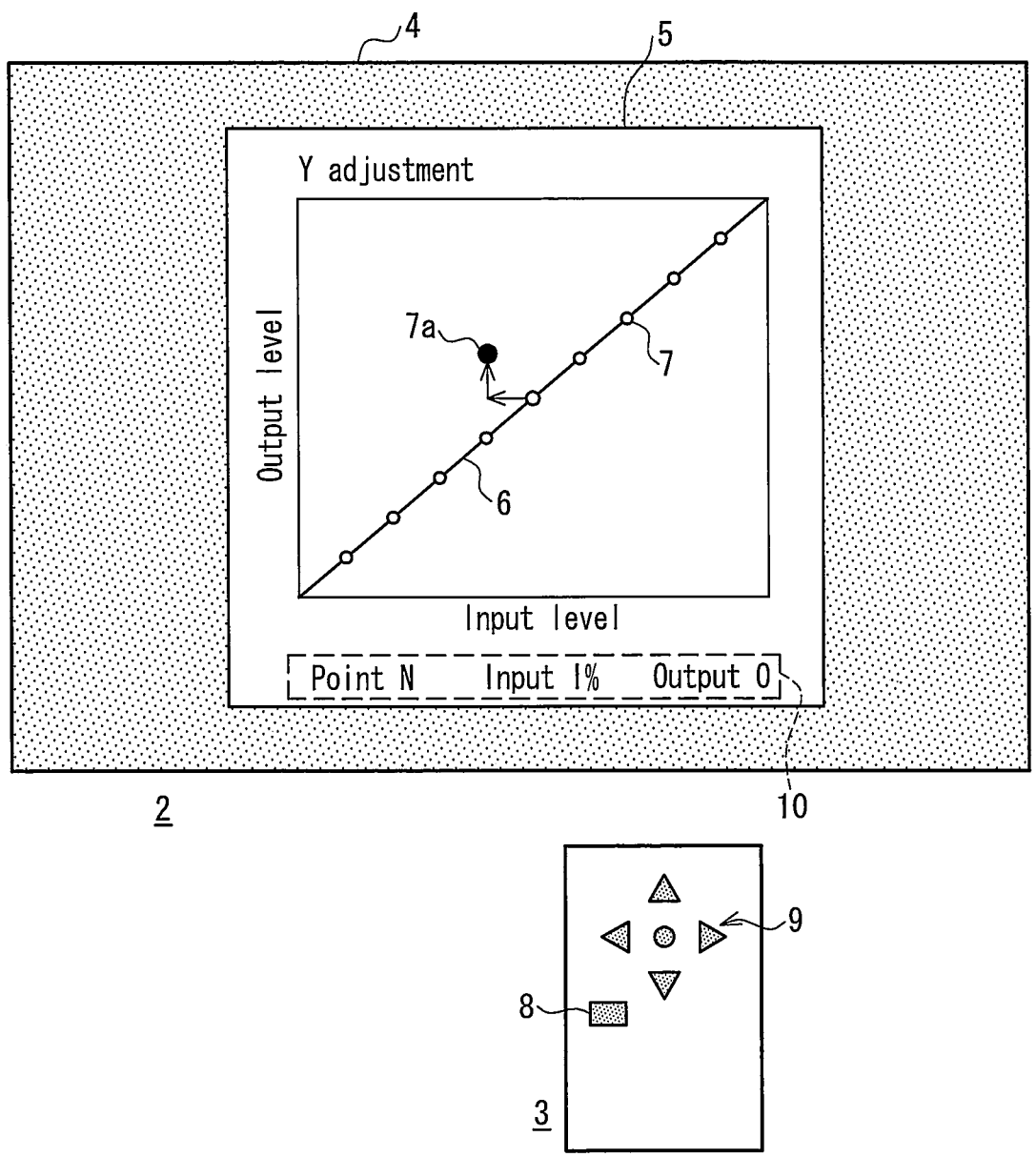
FIG. 3 is a diagram illustrating an operation of gamma adjustment in the image display apparatus of Embodiment 1 according to the present invention.
Figure 4:
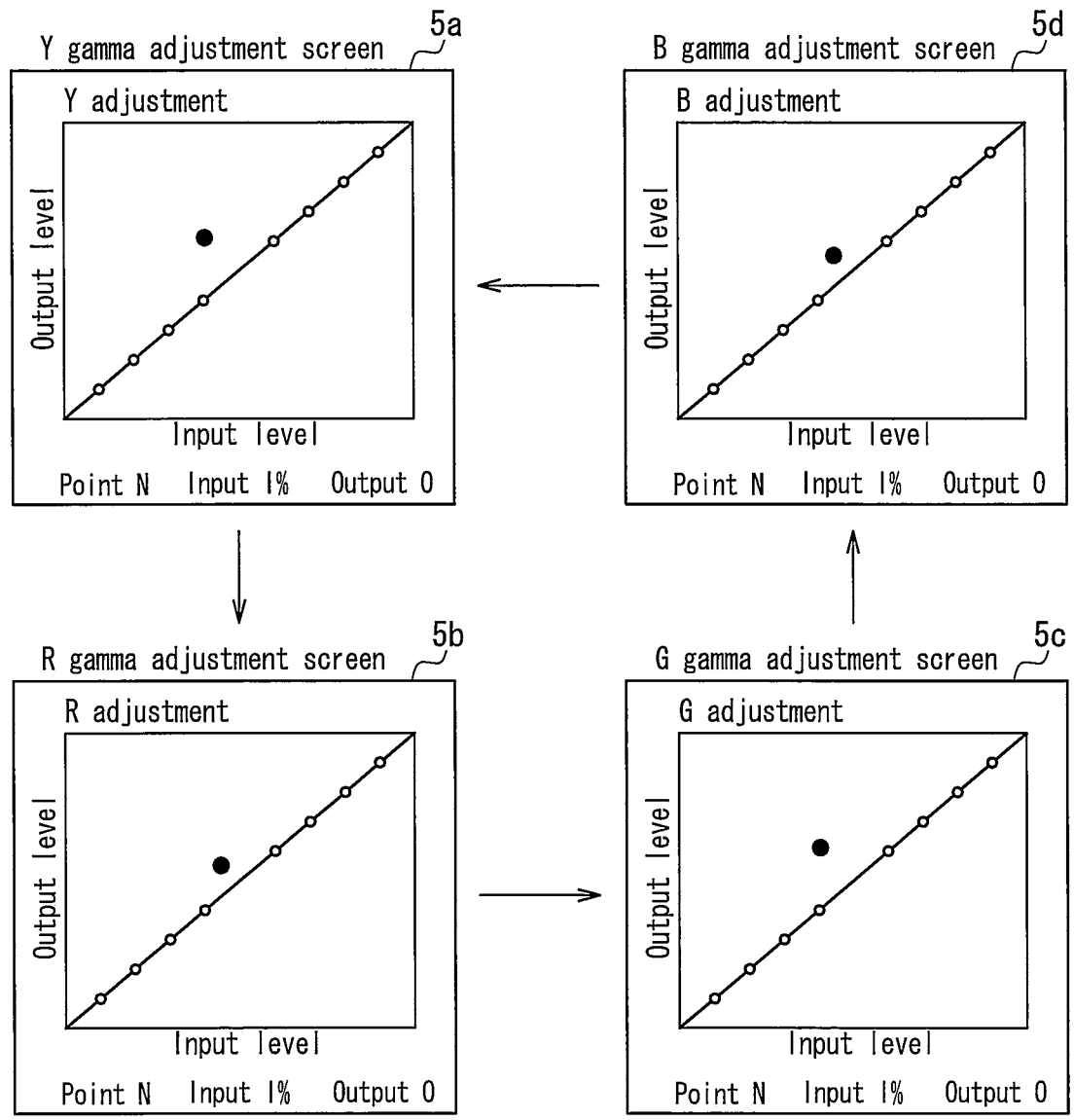
FIG. 4 is a diagram illustrating a transition of a gamma adjustment image in the image display apparatus of Embodiment 1 according to the present invention.

FIG. 3 is an explanatory diagram illustrating an operation of gamma adjustment in the image display apparatus 1 with the above-mentioned configuration. In the explanatory diagram, the display screen 2 and the remote controller 3 of FIG. 1 are displayed as seen when the gamma adjustment image 5 is in operation. That is, the adjustment point 7a in FIG. 3 indicates a position to which a currently selected gamma value is changed, and a character string 10 displays input/output values of adjustment points. Further, FIG. 4 is an explanatory diagram illustrating a transition of the gamma adjustment image 5 in the image display apparatus 1.

The operation of the image display apparatus configured as described above will be described with reference to FIGS. 2 to 4.

When remote control code information from the remote control photodetector part 18 is input to the main microcomputer 17 as a result of the operation by the remote controller 3, an on-screen menu is generated in a video signal by the on-screen generation processing circuit 16. The on-screen menu displays the gamma adjustment image 5 in the picture display image 4.

The gamma adjustment image 5 shows input/output characteristics of a video signal, configured so as to indicate an input level of a signal on the horizontal axis and an output level of a signal on the vertical axis, as described above. A lower left point of the image where the input level and the output level cross each other is an origin, and the input level shows a higher level in a rightward direction and the output level shows a higher level in an upward direction in the screen. The diagonal reference line 6 shows reference values at which gamma adjustment is not performed on the screen.

The currently selected adjustment point 7a is displayed so as to be discriminated from other adjustment points 7. When the adjustment point 7a is to be adjusted, the input level is changed with a right-and-left arrow button of the remote controller 3, and the output level is changed with an up-and-down arrow button. FIG. 3 shows a state in which the adjustment point 7a is changed in the leftward direction from the reference value, and further changed in the upward direction. The changed value is calculated by the main microcomputer 17 simultaneously, and data of the LUT 15 is rewritten by the result of the calculation, so as to be reflected immediately on the picture of the picture display image 4.

Regarding the processing by the main microcomputer 17, if linear interpolation is performed between the point of the changed value and an adjacent point, unsmoothness is caused in a picture. Therefore, it is necessary to calculate a smooth curve, using filtering with a low-pass filter, spline interpolation, etc., to create LUT data.

Further, the value obtained by changing the input level and the output level is displayed as a numerical value in the character string 10 of input/output display of adjustment points in the gamma adjustment image 5. In this case, for example, the input level is changed every 1% and displayed by "%". The output level is changed every 0.4% (1/255) and displayed by an integer value such as +1, +2, . . . , when increased and −1, −2, . . . , when decreased, with the reference value being 0. Another display method may be used.

Further, the gamma adjustment image 5 can be adjusted not only with Y (luminance) but also with R, G, and B individually. More specifically, by pressing another operation button of the remote controller 3, as illustrated in FIG. 4, the gamma adjustment image can be switched as follows: Y gamma adjustment image 5a→R gamma adjustment image 5b→G gamma adjustment image 5c→B gamma adjustment image 5d to select color, and thus, adjustment can be performed. Alternatively, a color may be adjusted by an on-screen menu.

Further, when a color is changed, an adjusted position calculated for each color of an adjustment point is displayed for each adjustment. For example, when Y (luminance) is adjusted, YCbCr→RGB conversion described later is performed, and when individual adjustment of R/G/B is performed, RGB→YCbCr conversion is performed, and the calculated value is reflected on the gamma adjustment image 5. Expressions used for conversions are as follows.

The following expressions are used for the RGB→YCbCr conversion.

$$Y=0.299 \times R+0.587 \times G+0.114 \times B;$$

$$Cb=-0.1687 \times R-0.3313 \times G+0.5 \times B;$$

$$Cr=0.5 \times R-0.4187 \times G-0.0813 \times B$$

The following expressions are used for the YCbCr→RGB conversion.

$$R=Y+1.402 \times Cr;$$

$$G=Y-0.34414 \times Cb-0.71414 \times Cr;$$

$$B=Y+1.772 \times Cb$$

When Y is adjusted as described above, the calculation results thereof are reflected on a graph on the gamma adjustment image 5 of each of R, G, and B. When R, G, and B are adjusted, the calculation results thereof are reflected on a graph on the gamma adjustment image 5 of Y. Regarding a change in the input level, the change is limited to the gamma adjustment image of Y so that the above-mentioned calculation is made easy with R, G, and B being at the same input level. It should be noted that an input level may be changed individually for each of R, G, and B.

The adjustment point 7a can be changed by pressing another operation button of the remote controller 3 or by an on-screen menu. In the figures, nine adjustment points 7 are shown; however, the present invention is not limited thereto as long as there is no issue with a memory capacity. The adjustment results are stored in the adjustment value storage memory 19 such as an EEPROM by the main microcomputer 17. A memory capacity can be saved if the storage of data of the adjustment points 7 is performed only for input signal levels, R adjustment values, G adjustment values, and B adjustment values of the 9 adjustment points 7, and when reading data from the memory, RGB→YCbCr conversion is calculated with respect to Y adjustment values. By assigning a plurality of adjustment results to the adjustment value storage memory 19 so that they are stored separately, data can be read easily.

Figure 5:
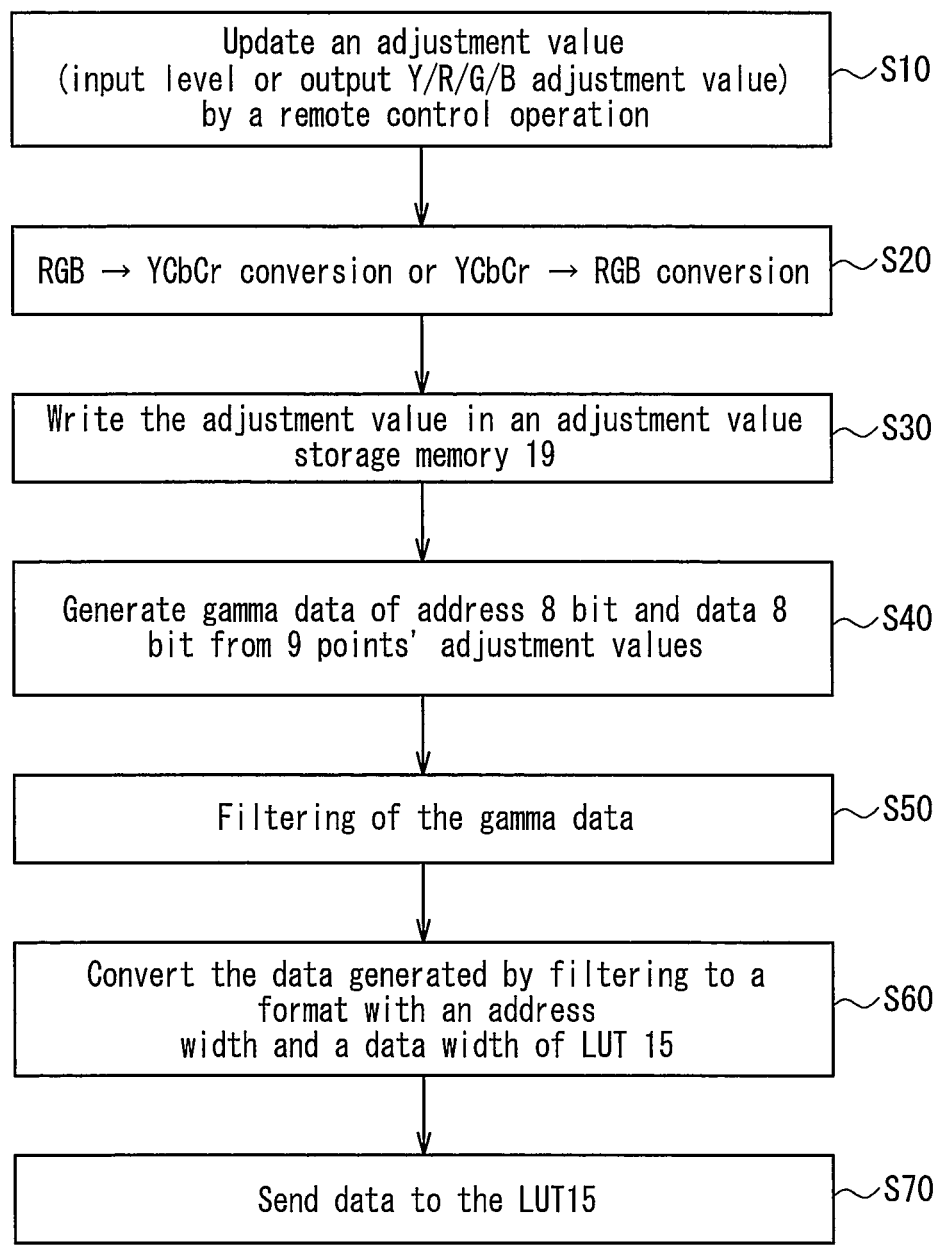
FIG. 5 is a flow chart of processing conducted by a main microcomputer at a time of gamma adjustment in the image display apparatus of Embodiment 1 according to the present invention.

FIG. 5 is a flow chart of main microcomputer processing at a time of gamma adjustment of the image display apparatus in the present embodiment.

In FIG. 5, when an adjustment value (an input level or an output Y/R/G/B adjustment value) of the adjustment point 7a selected by a remote control operation is updated (Step S10), the RGB→YCbCr conversion or the YCbCr→RGB conversion of the updated adjustment point 7a is performed (Step S20). After that, the adjustment values of the nine adjustment points 7 are written in the adjustment value storage memory 19 (Step S30). Next, gamma data of address 8 bit and data 8 bit is generated from the adjustment values of the nine adjustment points 7 (Step S40), and the gamma data is subjected to filtering (Step S50). Then, the data generated by the filtering is converted to a format with an address width and a date width of the LUT 15 (Step S60), and the data is sent to the LUT 15 (Step S70).

Figure 6:
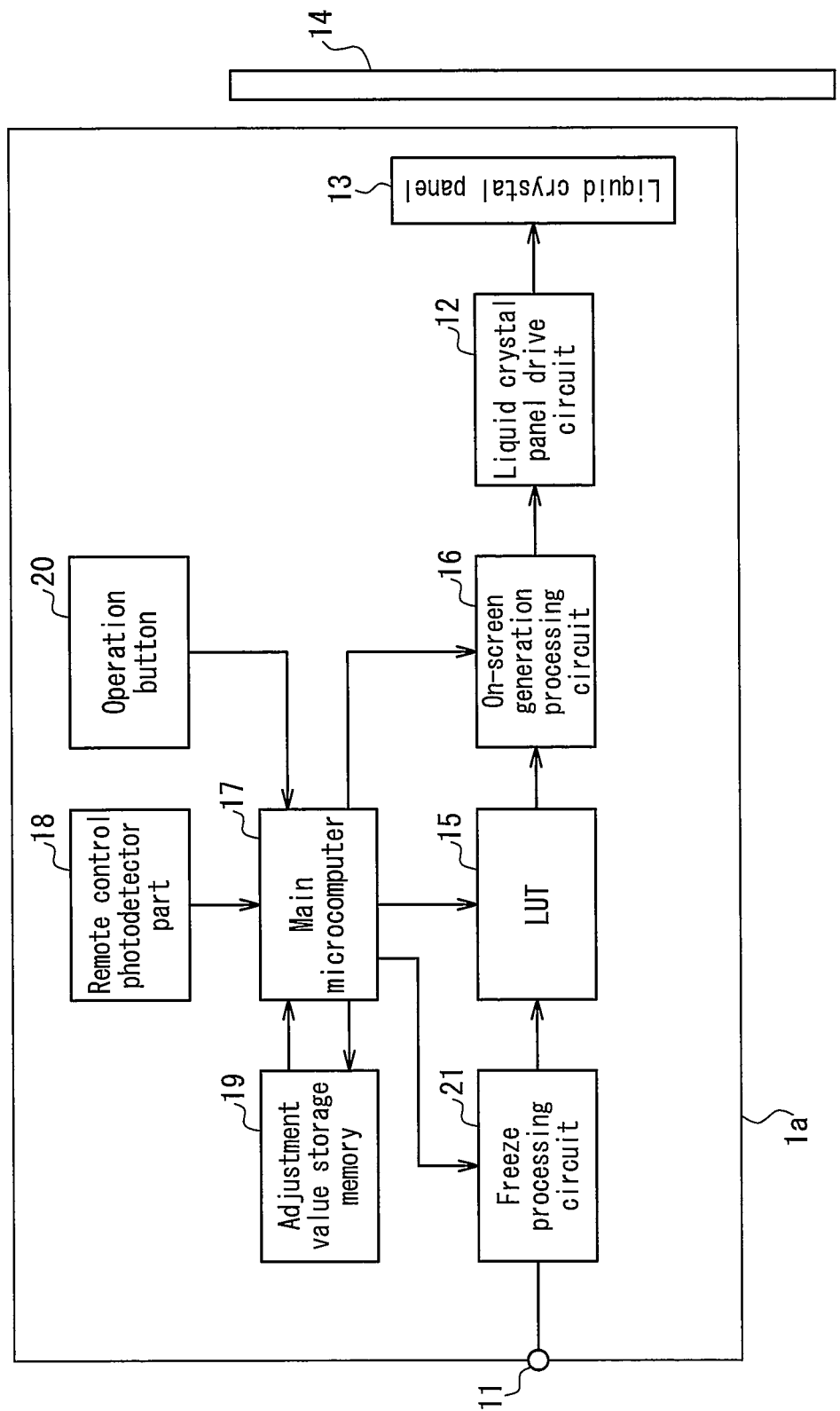
FIG. 6 is a block diagram illustrating another example of the circuit configuration of the image display apparatus of Embodiment 1 according to the present invention.

The circuit configuration of the image display apparatus 1 illustrated in FIG. 2 can be changed to the configuration as illustrated in the block diagram of FIG. 6. The configuration of the image display apparatus 1a of FIG. 6 is obtained by adding a freeze processing circuit 21 to the configuration of FIG. 2. According to this configuration, an image can be adjusted while a moving image signal is being frozen (made still).

Further, adjustment also can be performed with the operation buttons 20 of the main body instead of performing an operation with the remote controller 3.

Embodiment 2

Figure 7:
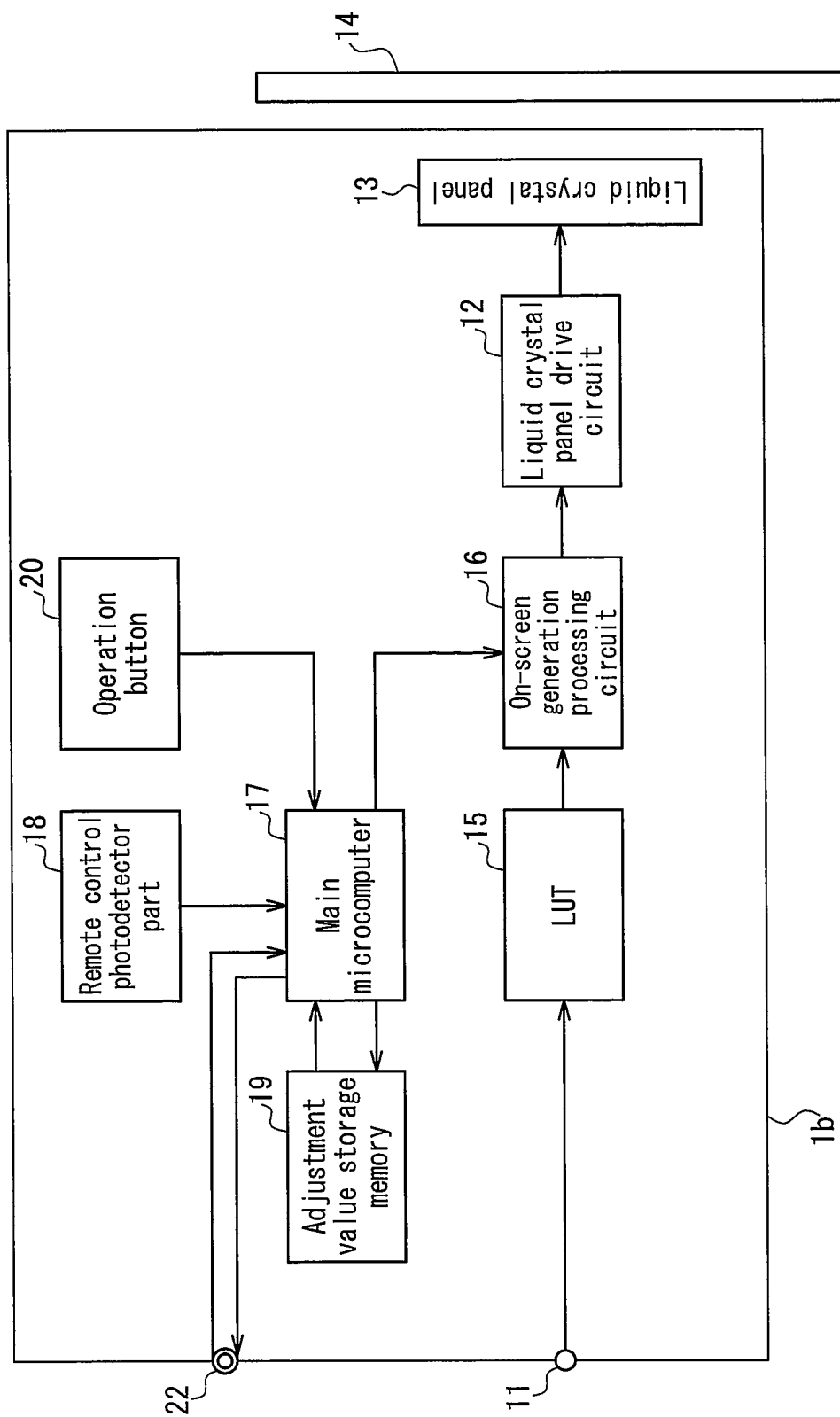
FIG. 7 is a block diagram illustrating a circuit configuration of an image display apparatus of Embodiment 2 according to the present invention.

FIG. 7 is a block diagram illustrating a circuit configuration of an image display apparatus 1b of Embodiment 2 according to the present invention. The image display apparatus 1b of FIG. 7 has a configuration obtained by further adding an input/output terminal for external control 22 such as RS-232C to the configuration of FIG. 2. The same constituent elements as those of FIG. 2 are denoted with the same reference numerals as those therein, and the detailed description thereof is omitted.

The input/output terminal for external control 22 is used for connecting the image display apparatus 1b to a personal computer. This enables data stored in the adjustment value storage memory 19 storing the results obtained by the above-mentioned gamma adjustment to be read or rewritten from outside. More specifically, data can be read to an externally controlling personal computer via the input/output terminal for external control 22 and the main microcomputer 17, using a command for control by RS-232C, and the read data can be rewritten to another device.

As described above, according to the present embodiment, gamma adjustment value data can be exchanged easily among users, for example, adjustment value data of the adjusted results can be copied to another image display apparatus, using a tool for controlling the image display apparatus 1b from outside.

Figure 8:
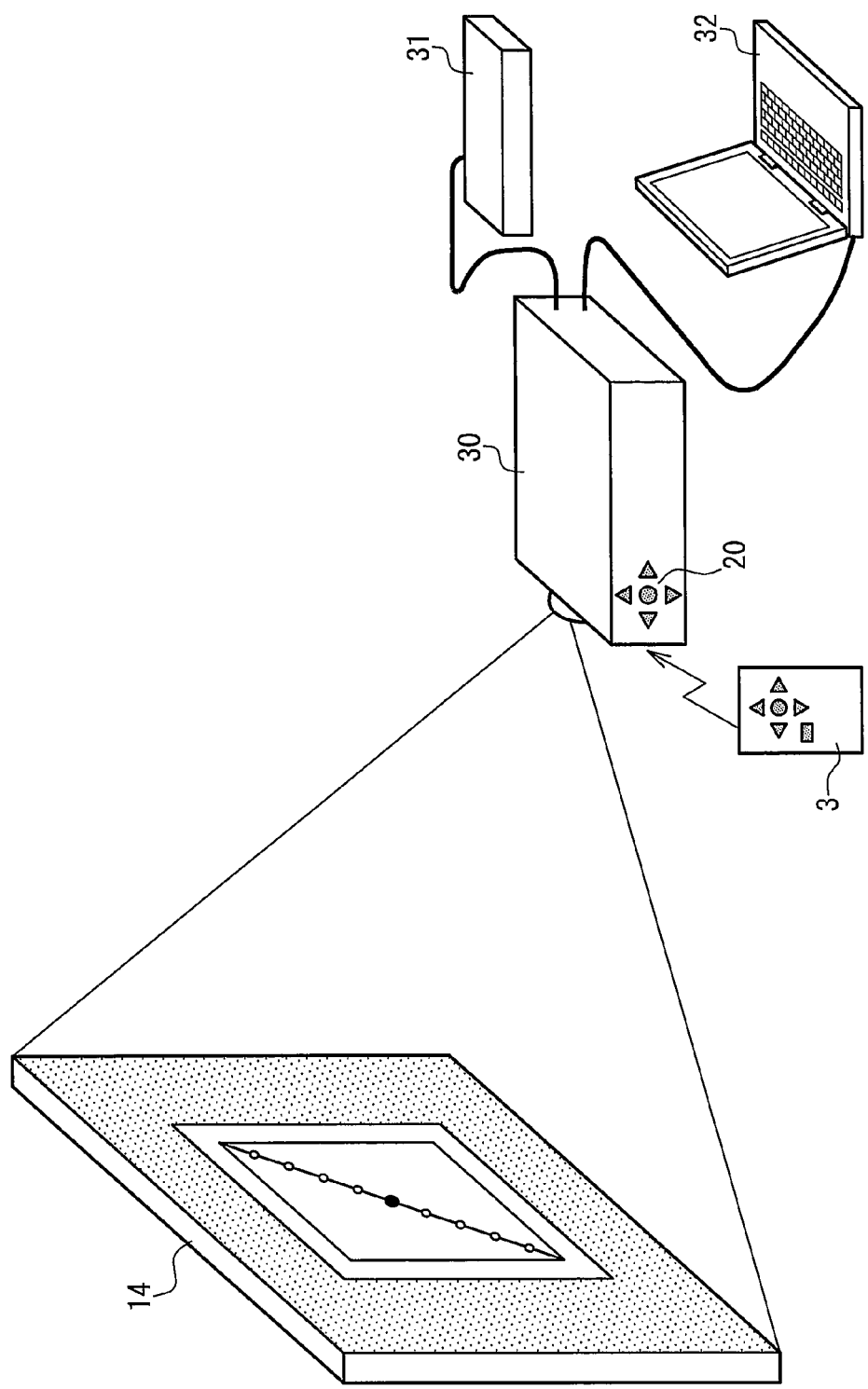
FIG. 8 is a perspective view illustrating a use form of a projector that is an image display apparatus of Embodiment 1 or 2 according to the present invention.

The projector that is the image display apparatus of Embodiment 1 or 2 configured as described above can be used in a form as shown in FIG. 8. In FIG. 8, a projector 30 performs signal processing inside with respect to a video signal from a BD player 31 connected to a picture input terminal, and develops the video signal onto a liquid crystal panel to display it on the screen 14 in an enlarged state. The adjustment of an image is performed by the remote controller 3 or the operation buttons 20 of the main body. Further, using a tool for controlling the device on a personal computer 32 connected to an input terminal for external control, the adjustment value data can be read to the tool and the adjustment value data can be rewritten to the main body of the device.

As described above, according to the image display apparatus and the image display method of the present invention, the gamma adjustment in the image display apparatus such as a projector can be performed when a user changes an input level and an output level of a video signal. Thus, the adjustment can be performed easily, freely, and in detail.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An image display apparatus, comprising:
   a picture display unit that forms and displays an optical image based on a video signal;
   a gamma adjustment image display unit that displays a gamma adjustment image containing input/output characteristics of a signal level of the video signal in the displayed optical image;
   an adjustment operation unit that changes the displayed input/output characteristics on the image; and
   an input/output characteristics setting unit that sets input/output characteristics of the signal level of the video signal in accordance with the input/output characteristics changed on the image,
   wherein input levels of a plurality of adjustment points are preset to fixed reference values, and
   the adjustment operation unit includes a point selecting part that selects one of the adjustment points desired to be changed in the input/output characteristics displayed in the image and a level changing part that is capable of changing both of the input level and an output level of the selected adjustment point, in which the input level can be changed from one of the fixed reference values to an intermediate value between the selected fixed reference value and a fixed reference value adjacent to the selected fixed reference value.

2. The image display apparatus according to claim 1, comprising an adjustment value storage memory capable of storing and reading data of the changed input/output level.

3. The image display apparatus according to claim 2, configured in such a manner that data of the stored input/output level is read and rewritten via an input/output terminal enabling control from outside.

4. The image display apparatus according to claim 1, wherein the adjustment operation unit is capable of performing an operation of changing an input level and an output level with respect to Y (luminance).

5. The image display apparatus according to claim 1, wherein the adjustment operation unit is capable of performing an operation of changing an input level and an output level with respect to any monochrome of R, G, and B.

6. The image display apparatus according to claim 1, comprising a freeze processing circuit enabling adjustment of the input/output characteristics while freezing a moving image signal.

7. An image display method, comprising:
   forming and displaying an optical image based on a video signal;
   displaying a gamma adjustment image containing input/output characteristics of a signal level of the video signal in the displayed optical image;
   changing the displayed input/output characteristics on the image; and
   setting the input/output characteristics of the signal level of the video signal in accordance with the input/output characteristics changed on the image,
   wherein, input levels of a plurality of adjustment points are preset to fixed reference values, and
   when the input/output characteristics are changed on the image, one of the adjustment points desired to be changed in the input/output characteristics displayed in the image is selected, and both of an input level and an output level of the selected adjustment point are changed, in which the input level can be changed from one of the fixed reference values to an intermediate value between the selected fixed reference value and a fixed reference value adjacent to the selected fixed reference value.

* * * * *